United States Patent [19]

Smith et al.

[11] 4,101,100
[45] Jul. 18, 1978

[54] AIRCRAFT FLIGHT LINE SERVICING SYSTEM

[75] Inventors: David W. Smith, Alexandria, Va.; Raymond C. LeBlanc, Potomac; J. Allen Oliver, Silver Spring, both of Md.

[73] Assignee: Value Engineering Company, Alexandria, Va.

[21] Appl. No.: 709,318

[22] Filed: Jul. 28, 1976

[51] Int. Cl.² .......................... B64F 1/28; B64F 1/34
[52] U.S. Cl. ............................ 244/114 R; 104/275; 137/561 R; 137/637.1; 141/98; 222/330; 244/53 A; 418/220
[58] Field of Search ............... 244/114 R, 53 A; 137/561 R, 637.1; 60/39.14; 138/105, 110; 141/98; 104/275; 418/220, 216; 62/5; 222/330; 404/1, 17, 18, 35, 71; 52/174, 33

[56] References Cited

U.S. PATENT DOCUMENTS

| 2,539,343 | 1/1951 | Boose | 104/275 |
| 3,022,095 | 2/1962 | Mazeika | 104/275 |
| 3,240,155 | 3/1966 | Quiroz | 418/220 |
| 3,591,962 | 7/1971 | Connell | 60/39.14 X |
| 3,630,040 | 12/1971 | Goldfarb | 62/5 |
| 3,810,705 | 5/1974 | Warriner | 404/1 |
| 4,033,379 | 7/1977 | Tooley | 137/637.1 |

FOREIGN PATENT DOCUMENTS

| 686,834 | 12/1939 | Fed. Rep. of Germany | 244/114 R |
| 550,506 | 1/1943 | United Kingdom | 104/275 |

OTHER PUBLICATIONS

Trammell, "Airports Need Better Engineering", Aviation Week, Jan. 24, 1949, pp. 22, 23 and 25.

Primary Examiner—Galen L. Barefoot
Attorney, Agent, or Firm—Edmund M. Jaskiewicz

[57] ABSTRACT

In an aircraft flight line servicing system there is provided an electrical power unit and an air compressor from which extend respectively a plurality of electrical and air distribution lines and a plurality of service islands are each connected to all of the electrical and air distribution lines. Each service island is provided with components for supplying both starting air and cooling air and electricity to aircraft. The distribution lines and service islands may be detachably mounted upon the surface of the flight line and have such a height and shape so as to enable aircraft tires to pass thereover.

6 Claims, 10 Drawing Figures

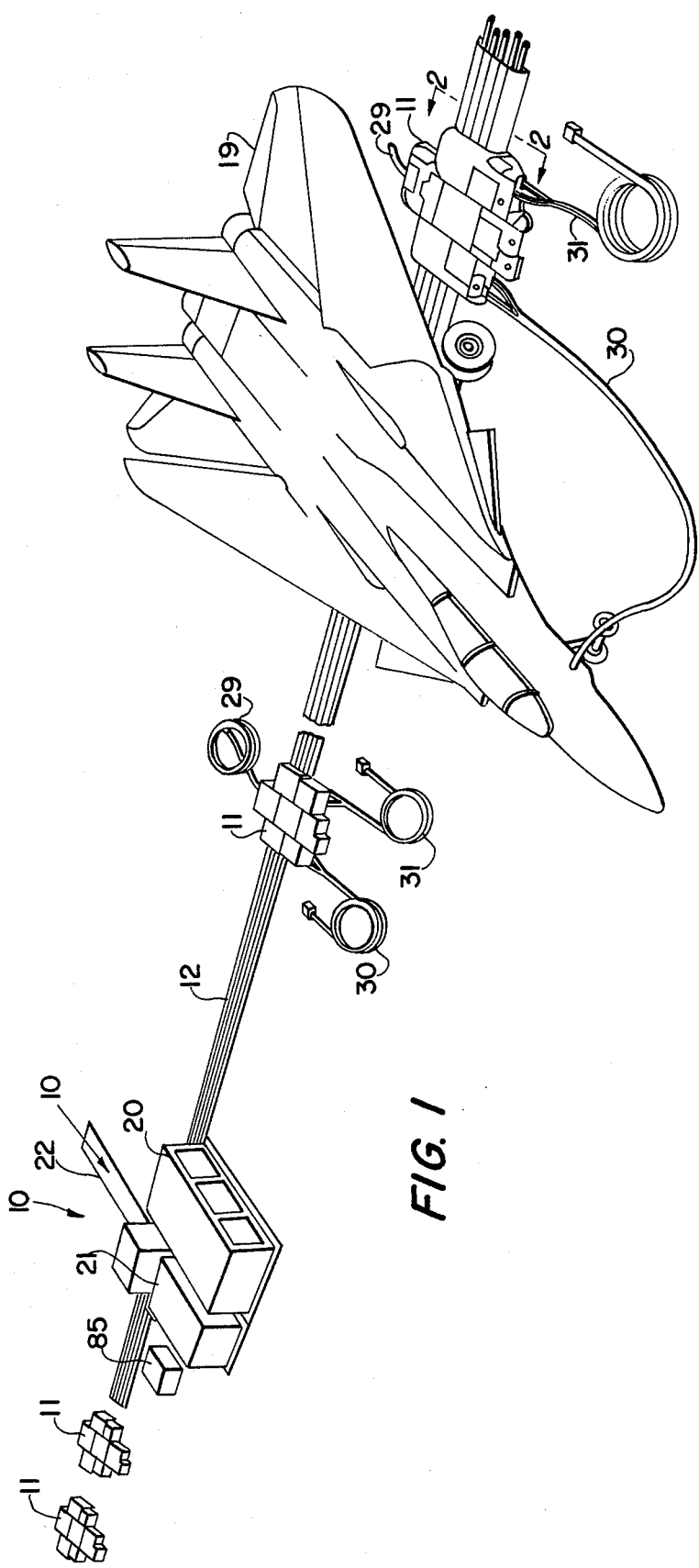
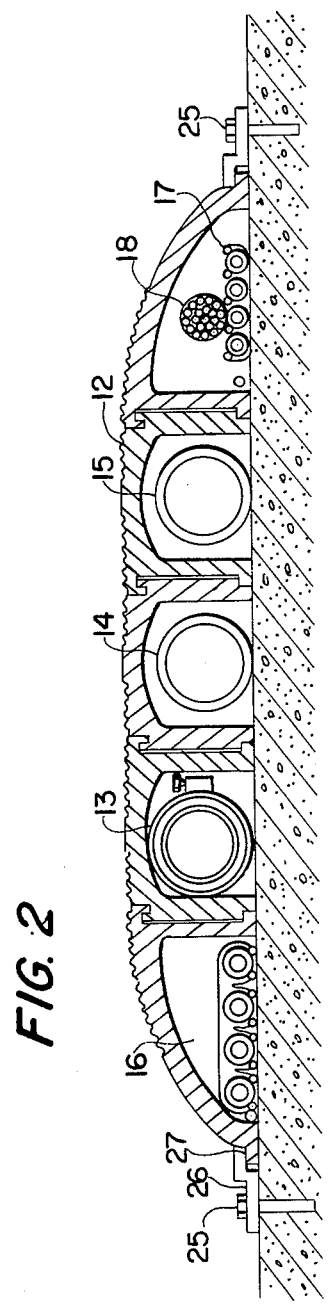
FIG. 1
FIG. 2

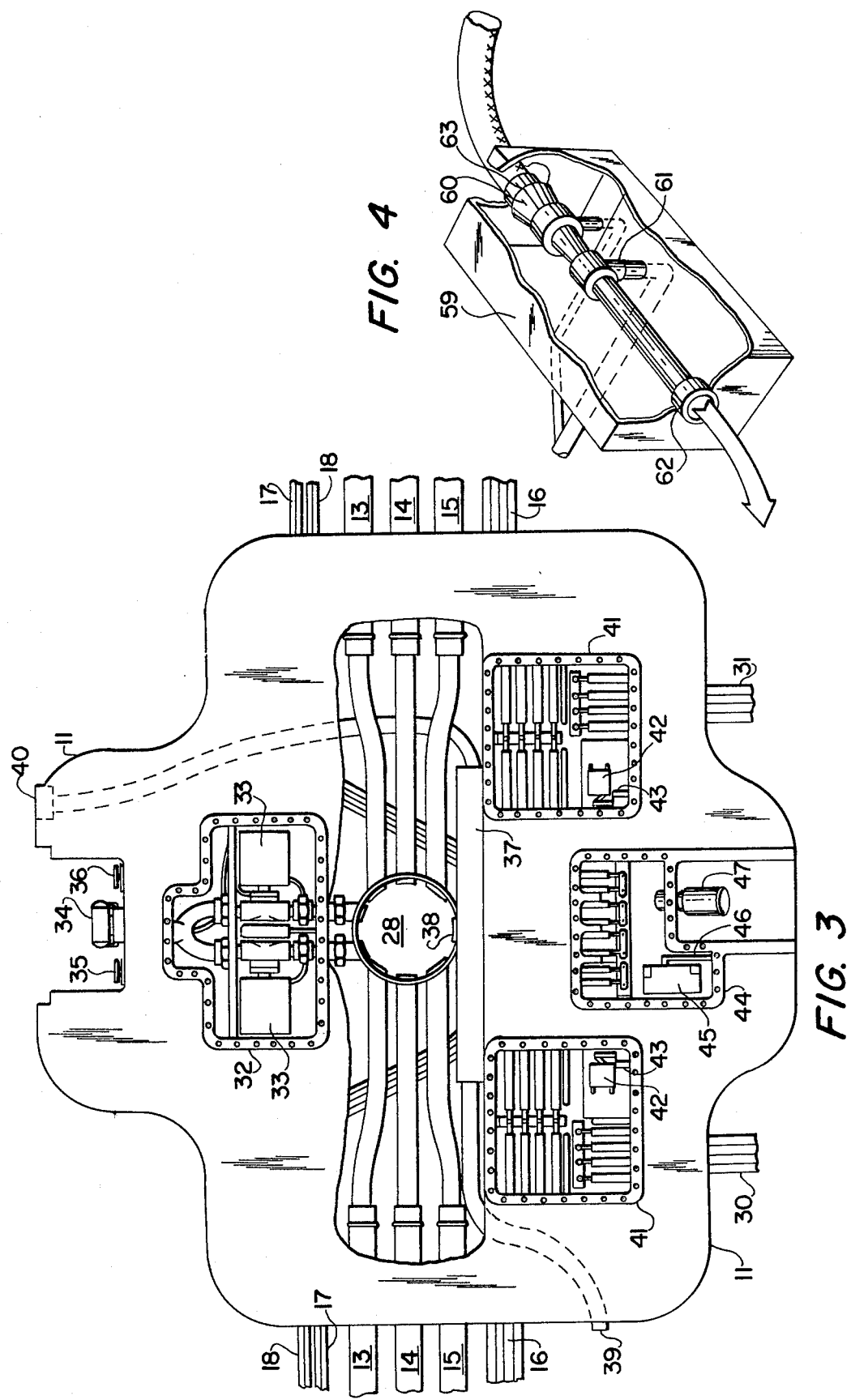

FIG. 7
FIG. 8
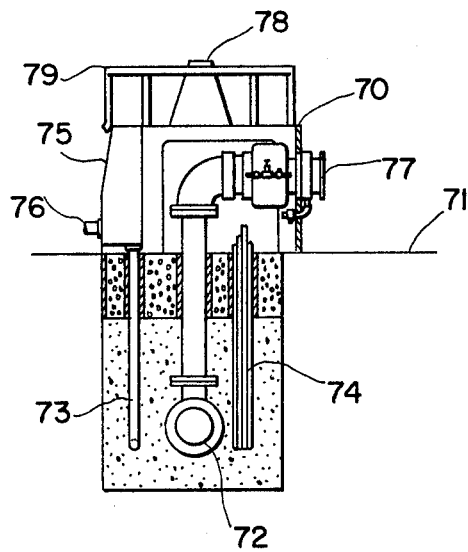
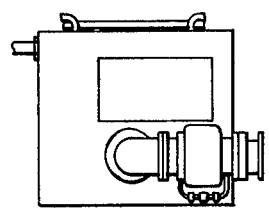
FIG. 9
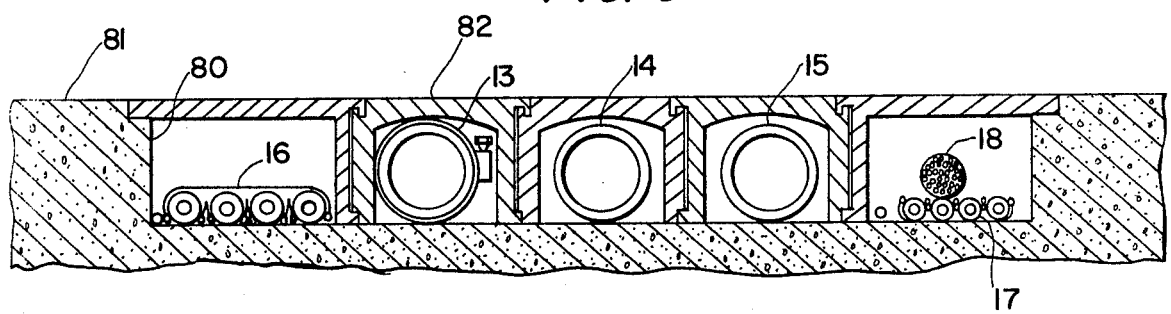
FIG. 10
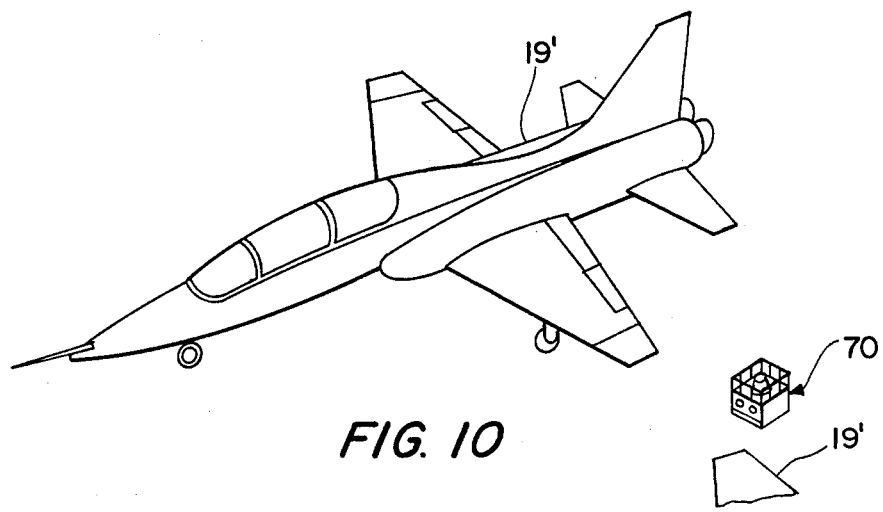

AIRCRAFT FLIGHT LINE SERVICING SYSTEM

The present invention relates to the servicing of aircraft on the flight line, more particularly, to a centralized system for quickly and adequately providing the utilities required to a number of aircraft on the flight line.

The servicing and starting of aircraft, particularly jet aircraft, on a flight line requires the ready availability of various utilities including air and electricity. Air must be supplied at a sufficient pressure in order to start the engines and a further supply of air must be provided at low temperatures to be used for cooling of the electronic equipment commonly found on modern aircraft. In addition, electrical energy at various voltages and frequencies must be supplied for various purposes.

It has been known to provide such utilities by mobile ground support equipment wherein each piece of equipment constituted an individual unit which must be moved from aircraft to aircraft in order to provide the desired utilities. In order to service a relatively large number of aircraft on the flight line it was necessary to provide a quantity of mobile units. The operation and maintenance of a large quantity of such mobile units became very expensive and complicated, particularly with the introduction of aircraft of greater sophistication which were more demanding in utility service.

A further drawback to the mobile utility units was that these units were designed during a period of time when energy costs were not only well below today's costs but fuels and energies were readily available. In addition, the design and construction of such mobile units was inflexible and each unit could service a limited number of aircraft. With the introduction of newer models of aircraft such mobile units became obsolete and it was necessary to construct new mobile units which again entailed considerable expense and time.

The operation of a large number of mobile units also required a considerable number of trained personnel in order to move the mobile units between aircraft and to provide the necessary maintenance services on the mobile units themselves.

Numerous attempts have been made to solve the problems arising from the use of such mobile units for aircraft flight lines servicing. While some of the proposed solutions were cost effective when compared to the previously known mobile units these solutions tended to be "one of a kind" installations which in turn gave rise to maintenance problems from a lack of spare parts availability. Proposed solutions up to the present time were not satisfactory since they did not provide the necessary reliability and flexibility required for the effective servicing of aircraft on the flight line.

It is therefore the principal object of the present invention to provide a novel and improved aircraft flight line servicing system.

It is another object of the present invention to provide a centralized aircraft flight line servicing system which is cost effective and has optimum flexibility in providing flight line utilities for military and other aircraft.

It is a further object of the present invention to provide an aircraft flight line servicing system which can be installed as a fixed point servicing system but which can be quickly removed and reinstalled at another location with a minimum of effort.

It is an additional object of the present invention to provide an aircraft flight line servicing system which is capable of multiple servicing of a number of aircraft, does not require a large area of dedicated space, is a demand-type system that does not require the use of energy to remain in a stand-by state and which provides maximum effectiveness with the lowest energy consumption and the least environmental impact.

It is still another object of the present invention to provide an aircraft flight line servicing system which has low initial cost, has high reliability and low maintenance costs, is simple to operate and provides for maximum safety to personnel and aircraft.

The objects of the present invention are achieved and the disadvantages of the prior art are eliminated by the aircraft flight line servicing system according to the present invention. This servicing system essentially comprises an electrical power unit connected to a source of electrical energy and having electrical outputs at predetermined voltages and frequencies. An air compressor unit which may be connected to the electrical power unit so as to be energized therefrom has a plurality of air outputs. A plurality of air and electrical distribution lines are connected to the electrical and air outputs and a plurality of service islands are each connected to all of the air and electrical distribution lines. Each service island is provided with means for providing air and electricity to individual aircraft.

The invention also provides for means at each service island or means which can be transported between service islands for providing additionally cooling air at each island from a single source of pressurized air provided by the compressor unit.

The service islands and distribution lines may be constructed of such a shape and size so as to enable aircraft to readily taxi over them. The distribution lines and service islands may be mounted on the flight line surface or may be disposed in shallow trenches and other underground installations for a more permanent unit.

Other objects and advantages of the present invention will be apparent upon reference to the accompanying description when taken in conjunction with the following drawings, which are exemplary, wherein;

FIG. 1 is an overall perspective view of the aircraft flight line servicing system according to the present invention and showing an aircraft at one of the service islands;

FIG. 2 is a sectional view taken along the line 2—2 of FIG. 1 showing the configuration of the ramps covering the distribution lines;

FIG. 3 is a top plan view of a service island with cover panels removed and portions thereof cut away and showing the controls and receptacles for the utilities;

FIG. 4 is a perspective view with a cut away portion of a transportable vortex tube for use at the service island;

FIG. 7 is a vertical sectional view of a service island connected to underground distribution lines;

FIG. 8 is a top-plan view of the service island of FIG. 7;

FIG. 9 is a transverse sectional view through a shallow trench showing the distribution lines therein; and, FIG. 10 is a perspective view of an aircraft at the service island of FIGS. 7 and 8.

Proceeding next to the drawings wherein like reference symbols indicate the same parts throughout the various views, a specific embodiment and modifications of the present invention will be described in detail.

Figure 5:
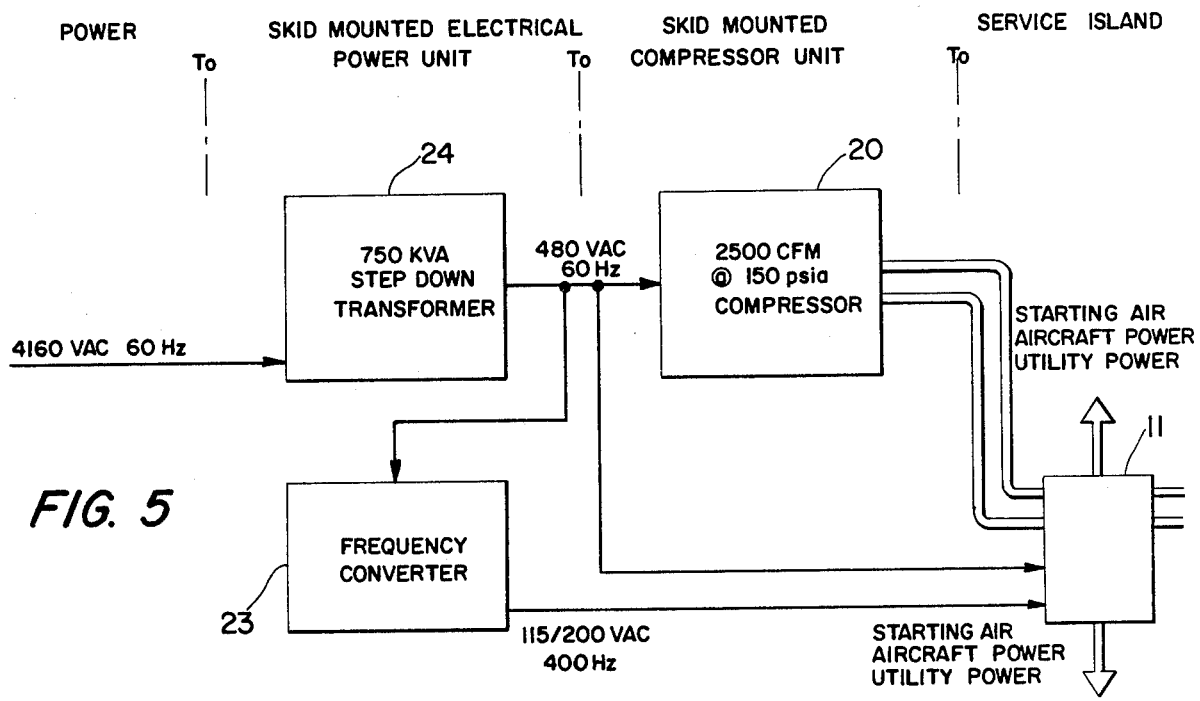
FIG. 5 is a schematic view showing the connections between the several components of the servicing system.

As may be seen in FIG. 1, the aircraft flight line servicing system according to the present invention comprises a prepackaged skid mounted central utility unit indicated generally at 10 and flanked on each side by three service islands 11 only two of which are shown on each side of the unit. The service islands 11 are connected to each other and to the central unit 10 by extruded aluminum ramps 12 shown in greater detail in FIG. 2 that are about five inches of less high and which cover and protect air distribution lines 13, 14 and 15 and the electrical distribution lines 16 and 17 and an air stop system control cable 18. The service islands 11 are approximately 120 feet apart and each contains the necessary electrical and air components to service two aircraft one of which 19 is shown at an island in FIG. 1.

The utility unit 10 comprises an electrical power unit 20 and an air compressor 21. The servicing system according to the present invention utilizes any voltage normally available for utility companies, such as, for example, 4160 VAC, three-phase, 60 Hz commercial station power which may be provided from a hangar through cables running under an extruded aluminum low-profile ramp 22. The ramp 22 may be less than three inches high and may have a configuration similar to that shown in FIG. 2. The ramp protects the cables from traffic and is readily secured into position with lag screws or other fasteners as will be later described.

The electrical power unit 20 is skid mounted and comprises a converter 23, a step down transformer 24 and a junction box with appropriate interlock for placing a back-up unit on line in case of station power failure. This system will distribute 115/200 VAC, three-phase, 400 Hz power to twelve aircraft. In addition, a 480 VAC, three-phase, 60 Hz service outlet is provided at each island 11 for utility power.

The ramp 12 protects the distribution lines running along the flight line from the utility package 10 to the service islands 11 and has a width of approximately 26 inches and height of about three and one-half inches. The ramp comprises a multi-section unit of extruded aluminum sections that locks together as shown in detail in FIG. 2 and thus provides flexibility for adding to or subtracting from the number of air hoses and electrical cables as well as decreasing extrusion die costs. Damage to any component allows that part to be easily replaced. The ramp 12 which in this embodiment is positioned upon the flight line surface is installed only by tying down each of the outer segments by lag bolts 25 which secure Z-clamps 26 against outer flanges 27 of the outer segment of the ramp.

Each service island 11 has a total height of four and one-half inches and a tapering configuration so that the island can be taxied over by aircraft without any damage to the aircraft. Each service island 11 comprises aluminum castings constructed to withstand the weight of aircraft that house all electrical gear in water-tight areas, a starting air manifold 28 and manual controls. Each island is weather-proofed by the use of suitable gaskets and is explosion-proof against any fuel vapors which may seep into the island in an airport environment. The island is constructed to contain any explosion which may occur and all components of the system meet all Federal safety requirements. The islands are secured to the flight line surface in the same manner as the ramps as described above.

The ramps and islands can be readily attached to concrete and other surfaces upon which aircraft are being serviced including landing matting as may be used by military operations or form temporary installations. For a concrete apron, studs may be fixed into the concrete utilizing standard concrete anchors and the ramps and islands bolted to these studs.

As may be seen in FIG. 3, the island 11 has an air start hose 29 and two electrical cables 30 and 31 and comprises a starting air distribution box 32, the cover of which is removed and within which are solenoid valves 33. Connected to the air distribution box 32 is a starting air receptacle 34 on one side of which is an air pressure selector 35 and on the other side an air control switch 36. Also connected to the manifold 28 is a vortex tube 37 for cooling air to which air is supplied at 38 and heated air is discharged at 39 and cooled air discharged at a cooling air receptacle 40.

A 400 Hz aircraft power distribution box 41, the cover of which is removed, is provided with a circuit breaker 42 and an aircraft service actuating means which may be a ring 43 and extending therefrom are the cables 30 and 31.

A 480 VAC utility power distribution box 44 is also shown with its cover removed and has a circuit breaker 45 and an actuating ring 46 and connected thereto is a utility service receptacle 47.

Figure 6:
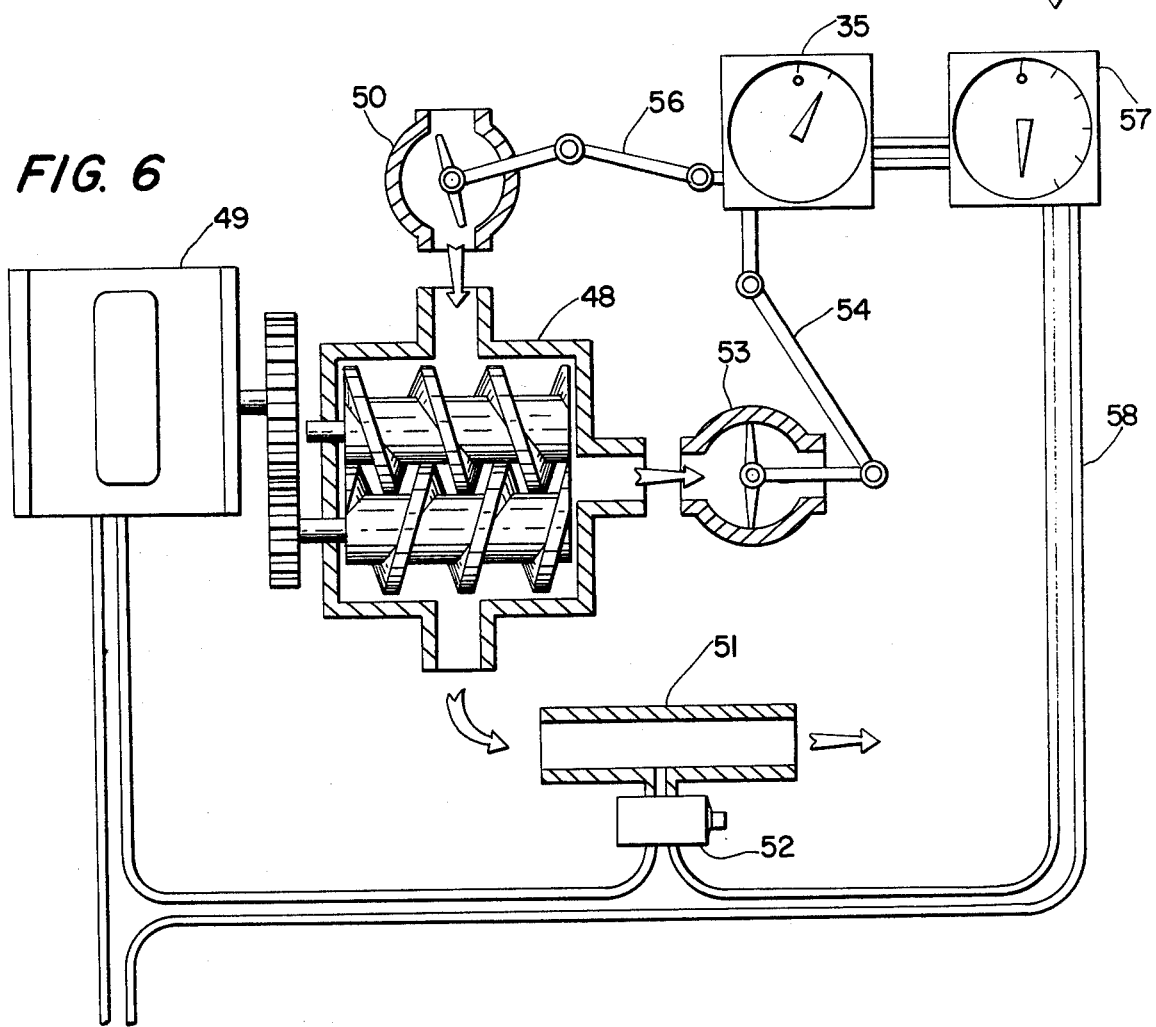
FIG. 6 is a schematic diagram of the screw compressor utilized in the servicing system.

The air compressor 21 may be an Ingersoll-Rand SPA 500 VHC compressor which can provide 2500 CFM air at 140 psia. The compressor 21 is self-contained, air-cooled screw-type compressor as schematically shown in FIG. 6 and is mounted on a skid for quiet operation and easy installation on the flight line.

The screw type compressor has the advantage of being able to fill the air distribution system in a relatively short time and it is not necessary to pump up the system to a high pressure and then permit the pressure in the system to drop off. The screw type compressor can quickly pump up to a pressure of 125 psi and can then maintain this pressure since it is characterized as being a high-flow low-pressure unit.

The air from the compressor 21 is distributed to the service islands 11 by the rubber hoses 13, 14 and 15 the lengths of which are shorter than the distances between the islands and these lengths are spliced together to facilitate replacement in the event of damage. The compressor 21 actually provides two different pressures and the use of a particular pressure at a service island is selected by controls provided on each island.

Since the outlet pressure at each service island may vary with the distances from the compressor 21, a pressure control system which is not shown, may be provided which includes pressure transducers at each service island to monitor the outlet pressure for transmission by way of on-line amplifiers to a pressure controller situated at the compressor skid 21. The output from this controller is proportional to the difference between a pre-set value and the actual pressure at a service island. Logic interlocked circuitry is also provided which allows only one service island to operate at any given time.

As shown schematically in FIG. 6, the compressor unit 21 has a compressor 48 driven by a motor 49 and receives intake air through a modulating valve 50. An outlet is connected to a manifold 51 to which is connected a pressure switch 52. A compressor case dump valve 53 is provided which is connected by linkage 54 to a load/no load timer 55 which is also connected by linkage 56 to the intake modulating valve 50. The stop/start timer 57 is connected to the electrical power lines 58 in a known manner.

Each service island 11 is provided with a pressure selector switch 35 as described above since aircraft starting requirements are generally classed into two categories. To start an aircraft engine, an operator initially connects the starter hose 29 to the air inlet port on the aircraft and sets the pressure selector switch 35 at the service island to the desired outlet pressure and then depresses the start switch 36. If no other service islands are in use as shown by a light indicator on each island, the operator will gain control of the air start system and pressurized air will be supplied to the engine. If another island is in use, the start switch 36 would remain inactive and the operator could not gain control of the air start system until all other service islands are inactive. When the engine has started, the operator would depress the stop switch which would halt the flow of air and thereby permit the operator to disconnect the starter hose from the aircraft air inlet port. On multi-engine aircraft, the operator would merely connect the starter hose to another engine and repeat the procedure.

The air distribution system may be provided with a check valve which reduces the line pressure when the system is closed so as to permit transfer from a high pressure to a low pressure air start without imparting a burst of high pressure into the air turbine starter which is designed to accept a lower pressure.

In order to provide electrical power to an aircraft the operator would remove the aircraft connector from the plug housing and connect the power service connector to the receptacle located on the aircraft. The operator then positions the corresponding circuit breaker to the "on" position by pulling the actuating ring outwardly. To remove power service from the aircraft, the operator first disengages power to the aircraft service connector by pushing the actuating ring inward to the "off" position and then removes the connector from the aircraft.

Cooling air for checking out the aircraft electronics equipment may be provided from the outlet 40 at each service island. This cooling air is provided from a vortex tube 37 as described above which utilizes as intake air the same air provided by the compressor for starting of the aircraft. Thus, each service island can provide both starting air and cooling air with both types of air being derived from a single air source.

As an alternative to having the vortex tube built into and being a part of the service island the vortex tube can also be mounted in a portable box which can be carried between the islands by an operator. Such a portable box is shown in FIG. 4 and indicated at 59 to housa a vortex tube 60. The vortex tube 60 has an air supply inlet 61, an outlet 62 for heated air and an outlet 63 for cooling air. The vortex tube relies on pressurized air supplied through the air start system for operation and cold air from the outlet of the vortex tube can be mixed with air from the air start system to provide the temperature and pressure required for avionics cooling. The vortex tube of FIG. 4 can either be carried by an operator or mounted on wheels for easy mobility between stations. The portable vortex tube of FIG. 4 or the built-in vortex tube of FIG. 3 provides far more efficient sources of cooling air at the service islands as compared to previous use of refrigeration equipment or the use of air-cooled chillers to supply chilled brine to the service islands by way of underground insulated pipe.

The vortex tube as used for cooling is known per se and is essentially an instrument for converting an ordinary supply of compressed air into two streams, one hot and one cold. The proportions of hot and cold air flows and their temperatures can be varied over a wide range, without moving parts and using only the compressed air as a source of energy. The compressed air is introduced into nozzles which inject the air at sonic speeds circumferentially into a vortex generation chamber. The spinning vortex of air moves through the tube through the hot outlet. Air near the surface of the tube becomes hot and leaves through the control valve at the hot outlet. This control valve imposes sufficient pressure on the vortex to force some of the air to the center and back through the vortex tube to the cold end. This air becomes very cold during this process and leaves the tube through the cold outlet.

Since the vortex tube requires only compressed air as a source of energy its performance is affected by the inlet air pressure, with the total air flow being proportional to absolute air pressure. The cold fraction of air, defined as a portion of the total air flow, is controlled by the throttling valve on the hot end. The temperature drop or rise through the vortex tube is a function of absolute inlet temperature. Maximum refrigeration is obtained from a vortex tube when the cold fraction is between 60-70%.

The service islands 11 of FIG. 3 can be replaced by the service islands of FIGS. 7 and 8. In FIGS. 7 and 8 a service island 70 extends only about 36 inches above the surface 71 of the flight line so as to be easily cleared by aircraft as seen in FIG. 10, and is connected to an air distribution line 72 and electrical distribution lines 73 and 74 located underground. The use of underground distribution lines would be more suitable for a permanent installation. The service island 70 comprises a control panel 75, an aircraft service cable 76 and an air hose connection 77. Mounted on the top of the island is an obstruction light 78 surrounded by a guard rail 79.

In FIG. 9, the air and electrical distribution lines are positioned in a shallow trench 80 formed in the concrete apron 81 defining the surface of the flight line. The distribution lines may be covered by ramp segments similar to those illustrated in FIG. 2 so as to define a flush surface 82. These shallow trenches 80 may lead to service islands which project only a few inches above the ground as shown in FIGS. 1 and 3 or to service islands which are also flush with the surface of the flight line.

The service islands 11 can be equipped with other utilities such as gases including nitrogen and hydrogen used to pump up struts or repressure nose wheel suspension systems, or for other specialized purposes. Such additional gases can be provided from a source 85 located at the central utility unit 10 of FIG. 1.

Thus it can be seen that the present invention has disclosed an aircraft flight line servicing system which can service effectively a number of aircraft from a single utility source. Two aircraft are thus serviced at each service island which provides electricity, starting air and cooling air. The present invention also discloses the use of a vortex tube for providing cooling air for aircraft servicing and maintenance. The system according to the present invention can be readily picked up, moved and re-assembled and its components can be transported by truck, rail or air. Each of the service islands are essentially distribution boxes which may be provided with air pressure regulation equipment, voltage protection and regulation equipment, and also voltage conversion and power conversion equipment so as to avoid voltage drop in transmitting of electrical energy from a central unit to the islands.

The advantages of this servicing system include saving considerable energy since the system replaces mobile units each of which must be provided with a prime mover. The modular construction of the system enables air and electrical power to be modified for the needs of specific aircraft and can be expanded to accommodate different numbers of aircraft. The system also provides for economies of fabrication and operation and the saving of the need of highly trained personnel in both operation and maintenance work. The low profile and configuration of the components of the servicing system reduce accidents since components of the system can be traveled over by aircraft without any damage to the aircraft or damage to the servicing system. Since the various components of the system are fixed in position for operation there is eliminated the problem of mobile units running into aircraft and vice versa.

It will be understood that this invention is susceptible to modification in order to adapt it to different usages and conditions, and accordingly, it is desired to comprehend such modifications within this invention as may fall within the scope of appended claims.

What is claimed is:

1. An aircraft flight line servicing system comprising a source of electrical energy having an electrical output at a predetermined voltage and frequency, an air compressor unit having an air output, a plurality of air and electrical distribution lines connected to said air and electrical outputs and positioned upon the flight line surface, a ramp having sloping longitudinal edges disposed over said air and electrical distribution lines and having a height of about 3.5 inches to enable aircraft tires to pass thereover, a plurality of service islands disposed on the flight line surface serially connected to all of said air and distribution lines and to said ramp and spaced apart a distance sufficient to accommodate two aircraft between successive islands, each island having a maximum height of about 4.5 inches and a tapering configuration so that an aircraft can taxi over the island, each island having air and electrical connections thereon to service aircraft.

2. An aircraft flight line servicing system as claimed in claim 1 wherein each island has connections thereon to service two aircraft.

3. An aircraft flight line servicing system as claimed in claim 1 wherein said air compressor unit has a low-pressure high-volume air output.

4. An aircraft flight line servicing system as claimed in claim 1 wherein said service islands each supply electrical energy comprising 3-phase, 115/200 VAC at 400 hertz.

5. An aircraft flight line servicing system as claimed in claim 1 and means engageable with the longitudinal edges of a ramp for detachably mounting said ramp upon the flight line surface.

6. An aircraft flight line servicing system as claimed in claim 1 wherein said service island has two air outputs at different pressures.

* * * * *